United States Patent
Lehmann

(10) Patent No.: US 7,939,605 B2
(45) Date of Patent: May 10, 2011

(54) LONG-TERM STABLE OIL PTFE DISPERSION AND METHOD FOR ITS PRODUCTION

(75) Inventor: Dieter Lehmann, Coswig (DE)

(73) Assignee: Leibniz—Institut Fuer Polymerforschung Dresden E.V., Dresden (DE)

( * ) Notice: Subject to any disclaimer, the term of this patent is extended or adjusted under 35 U.S.C. 154(b) by 0 days.

(21) Appl. No.: 12/739,656

(22) PCT Filed: Dec. 9, 2008

(86) PCT No.: PCT/EP2008/067082
§ 371 (c)(1), (2), (4) Date: Apr. 23, 2010

(87) PCT Pub. No.: WO2009/080493
PCT Pub. Date: Jul. 2, 2009

(65) Prior Publication Data
US 2010/0222495 A1    Sep. 2, 2010

(30) Foreign Application Priority Data
Dec. 23, 2007   (DE) .......... 10 2007 055 927

(51) Int. Cl.
*C08F 8/00* (2006.01)

(52) U.S. Cl. ............. 525/326.3; 525/199; 508/117; 508/138; 508/181; 522/104; 522/156; 524/546; 526/255

(58) Field of Classification Search ........... 508/117, 508/138, 181; 522/104, 156; 524/546; 525/199, 525/326.3; 526/255
See application file for complete search history.

(56) References Cited

U.S. PATENT DOCUMENTS

| | | |
|---|---|---|
| 3,933,656 A | 1/1976 | Reick |
| 4,465,607 A | 8/1984 | Cottell |
| 5,744,539 A | 4/1998 | McCoy et al. |
| 5,846,447 A | 12/1998 | Beatty |

FOREIGN PATENT DOCUMENTS

| | | |
|---|---|---|
| DE | 251988 | 12/1987 |
| DE | 36 42 617 | 4/1988 |
| DE | 10351812 | 6/2005 |
| DE | 10351813 | 6/2005 |
| DE | 102004016873 | 10/2005 |
| DE | 102004016876 | 10/2005 |
| FR | 2857373 | 1/2005 |
| JP | 11021577 | 1/1999 |
| JP | 2003113390 | 4/2003 |
| NL | 9300742 | 12/1994 |
| PL | 295402 | 7/1992 |

OTHER PUBLICATIONS

Ivanov et al., "Tribological Properties of the Grease Containing Polytetrafluoethylene and Ultradispersed Diamonds," *Jounal of Friction and Wear*, vol. 25, No. 1, pp. 88-92 (2004).
Driescher et al., "PTFE-modifizierte Schmierstoffe in der Feingera-etetechnik," *Schmierungstechnik*, Berlin 15 (1984) 7.
Abstract of RU 2212418 published Sep. 20, 2003.
Palios et al., "Behaviour of PTFE suspensions in rolling/sliding contacts," Tribology Series (1996), Publisher: Elsevier Science B.V.

*Primary Examiner* — Mark Eashoo
*Assistant Examiner* — Nicole M Buie-Hatcher
(74) *Attorney, Agent, or Firm* — Greenblum & Bernstein, P.L.C.

(57) ABSTRACT

The invention relates to the field of chemistry and relates to long-term stable oil PTFE dispersions, such as can be used, for example, in transmissions or bearings, and a method for the production thereof. The object of the present invention is therefore to disclose a long-term stable oil PTFE dispersion as well as a simple and cost-effective method for the production thereof. The object is attained with an oil PTFE dispersion comprising PTFE particles and a monoolefinically or polyolefinically unsaturated oil, wherein molecules of the olefinically unsaturated oil are covalently/chemically coupled to PTFE (primary) particle surfaces via radical reactions, and wherein a permanent charge separation between the PTFE particle surfaces and the coupled oil molecules is present and a fine dispersion of the PTFE particles in the oil or oil mixture is present. The object is furthermore attained through a method in which the modified PTFE (emulsion) polymers are mixed with persistent perfluoro (peroxy) radicals jointly with an olefinically unsaturated oil and subsequently the modified PTFE (emulsion) polymers are subjected to a mechanical stress.

18 Claims, No Drawings

LONG-TERM STABLE OIL PTFE DISPERSION AND METHOD FOR ITS PRODUCTION

CROSS-REFERENCE TO RELATED APPLICATIONS

The present application is a U.S. National Stage of International Patent Application No. PCT/EP2008/067082 filed Dec. 8, 2008, and claims priority under 35 U.S.C. §§119 and 371 of German Patent Application No. 10 2007 055 927.7 filed Dec. 23, 2007.

BACKGROUND OF THE INVENTION

1. Field of the Invention

The invention relates to the fields of mechanical engineering and chemistry and relates to long-term stable oil polytetrafluoroethylene (PTFE) dispersions, such as can be used, for example, in moving parts with tribological requirements in terms of sliding friction and wear, such as, for example, in transmissions or bearings, and a method for the production thereof.

2. Discussion of Background Information

A great number of oil-PTFE dispersions are described. A dispersion of PTFE in oil led in a short time, with as well as without additives, to sedimentation of the PTFE, which then can usually be fluidized/redispersed only with great difficulty.

However, very many publications deal only with the composition of the dispersions or with the use of special additives for better stabilization of the dispersion, the focus not being on the dispersion stability.

From FR 2857373 A1 a PTFE-containing mineral oil is known with 80 to 97 (preferably 95 to 97) % by weight of mineral oil and 0.5 to 1.5 (preferably approx. 1) % by weight of submicron PTFE, as well as perfume and dye additives, in the dispersion for domestic and workshop use.

Likewise known are the tests according to M. G. Ivanov et al., Ural. Gos. Tekh. Univ. UPI, Yekaterinburg, Russia. Trenie i Iznos (2004), 25(1), p. 99-103 on the tribological properties of a lubricant, comprising oil, PTFE and ultradispersed diamond, in a steel-on-steel friction couple.

Furthermore, according to JP 2003113390 A a method is known for dispersing PTFE powder (average particle diameter of 7 μm) in basic lubricating oil at $\leq 40°$ in an overpressure homogenizer and then in a ball mill to reduce the average particle size $\leq 1$ μm for the production of lubricating oil additives for diesel engine crankshaft housings.

These publications do not give any information on dispersion stability.

Furthermore, according to JP 11021577 A, a lubricant is known, which is composed of a base oil (1) selected from plant oils, animal fats, mineral oils, ester oils, mixed oils and modified oils and PTFE powder (2), which was dispersed in the base oil in the presence of a multivalent metal salt of a higher fatty acid, which is dissolved in the base oil.

Likewise known according to U.S. Pat. No. 5,846,447 is a process for forming PTFE dispersions in an organic carrier fluid (particularly lubricating oil), in which (1) the treatment of the PTFE particles diameter<1 μm (preferably <0.25 μm) with electron radiation or gamma irradiation of $\geq 4$ Mrad in the presence of atmospheric oxygen and water, (2) the mixing of the irradiated particles with the lubricating oil and $\geq 1$/at least one dispersant, and (3) the passage of this mixture through a plurality of nozzles within a liquid-jet interaction chamber takes place at a pressure of $\geq 1000$ psi to deagglomerate and stabilize the PTFE particles. It is reported that the method yields a stable uniform PTFE dispersion and the introduction of undesirable water into the lubricant is avoided.

According to U.S. Pat. No. 5,744,539 A, furthermore a PTFE dispersion is known, which essentially comprises a stable dispersion of finely distributed PTFE particles and a polymeric dispersant in a lubricating oil, in which the dispersions are essentially free of a PTFE sedimentation.

According to PL 168489 B1 a method for producing PTFE suspensions is described, which are used as additives for lubricants and hydraulic oils. A 16% by weight aqueous PTFE suspension (containing PTFE 60, ammonium perfluorocaprylate 0.02, nonionic surfactants 0.02, etc.) is added to lubricating oils and hydraulic fluids. In the further production process 0.2 to 4% by weight dispersant, 0.3 to 4% by weight surfactant and 20% by weight thickener are also added to the oil mixture.

From NL 9300742 A a lubricant is known, based on a solid resin (Teflon/PTFE), which is dispersed in a carrier in the lubricant. The carrier substance is silicone oil; the dispersing is carried out in the presence of a dispersant.

Furthermore, a method is known from DE 36 42 617 C1 for producing a PTFE dispersion, which is mixed in oil as lubricating oil or its additives, in which PTFE in powder form or as an aqueous dispersion in the presence of nonionic surfactants (antistatic agents) in a commercial mineral oil.

According to DD 25 19 88 A1 a PTFE-containing lubricant is known, which as a dispersant contains polyfluorocarboxylic acids and esters thereof, which improve the stability of the dispersed PTFE powder with particle sizes of 0.1 to 0.5 μm.

H. Driescher et al., Schmierungstechnik (1984), 15(7), 199-202, describe the active service life of a precision lubricant for use in high vacuum, in which fine oil is used, which contains PTFE fine powder and, to stabilize the PTFE dispersion, perfluoroalkenyl alkyl ether dispersant.

According to U.S. Pat. No. 3,933,656 A a lubricating oil with fluorocarbon additive with boundary layer properties and with a reduced emission is known, in which 300 cm$^3$ submicron-size PTFE [9002-84-0] powder and 30 cm$^3$ silane A 1100 [919-30-2] is dispersed in the same amount of motor oil.

It is known from all of these disclosures that a certain dispersion stability can be achieved at all or can be increased only through the addition of additives.

Furthermore, according to RU 2212418 C1 a dispersion of ultrafine PTFE is known, produced by thermal decomposition of PTFE at 480 to 540° C. in the presence of an oxygen-containing compound that is thermodynamically suitable for PTFE oxidation, under the atmosphere of the gaseous degradation products. The degradation products/decomposition products from the degradation process are cooled and condensed during passage through a mineral oil, whereby a PTFE dispersion (12.9 g dry PTFE with an oxygen content of 1.7%) is formed. The ultrafine PTFE formed is lyophilic and forms stable dispersions without the addition of stabilizers or surfactants.

The described gaseous oxidized degradation products of the PTFE are thereby in fact no longer PTFE, since they no longer exhibit the advantageous properties of PTFE to the full extent.

From U.S. Pat. No. 4,465,607 A furthermore a PTFE-containing lubricant composition is known, in which the PTFE with particle sizes of 1 to 200 μm produces stable dispersions through ultrasonic agitation/treatment in a base lubricating oil. No information is provided on the long-term stability.

S. Palios et al., Tribology Series (1996), 141-152, Publisher: Elsevier, tested the behavior of PTFE suspensions (PTFE in lubricating oil) as a function of the PTFE particle size in rolling/sliding contact. Larger PTFE particles appear to reduce friction and wear. It was not disclosed whether the particles adhere strongly to the rubbing side and form a permanent coating. Very small PTFE particles in completely formulated oils do not appear to make any measurable contribution to the reduction of friction and wear.

The principle of reactive coupling/surface modification of PTFE nano/micro powder particles with olefinically unsaturated monomers/compounds is already known from DE 103 51 812 A1, DE 103 51 813 A1 and DE 10 2004 016 876 A1.

The disadvantages of the known solutions are that no long-term stable oil PTFE dispersions are known.

SUMMARY OF THE EMBODIMENTS

Embodiments of the invention are directed a long-term stable oil PTFE dispersion as well as a simple and cost-effective method for the production thereof.

The embodiments of the invention are described in the claims. Advantageous embodiments are the subject matter of the subordinate claims.

The long-term stable oil PTFE dispersion according to the invention comprising PTFE particles and at least one monoolefinically or polyolefinically unsaturated oil or oil mixture, wherein the molecules of the olefinically unsaturated oil or of the olefinically unsaturated components of the oil mixture are covalently/chemically coupled to PTFE (primary) particle surfaces via radical reactions, and wherein a permanent charge separation between the PTFE particle surfaces and the coupled oil molecules is present and a fine dispersion of the PTFE particles in the oil or oil mixture is present.

Advantageously, the oils or oil mixtures are composed mainly or entirely of olefinically unsaturated oils or oil components.

Likewise advantageously, the PTFE modified with oil is present in the oil PTFE dispersions concentrated to 90% by weight or diluted to 0.1% by weight, even more advantageously up to 60% by weight or diluted to 1.0% by weight or to 30% by weight or diluted to 3.0% by weight, wherein advantageously the diluted oil PTFE dispersions are present diluted with the same oil or oil mixture of the oil PTFE dispersion, or the diluted oil PTFE dispersions are present diluted with an oil or oil mixture that is different from that used but can be mixed with the oil PTFE dispersion.

Furthermore advantageously, the permanent charge separation between the PTFE particle (surfaces) and the coupled oil molecules has an order of magnitude such that the dispersed PTFE particles repel one another.

And also advantageously, the permanent charge separation has at least one order of magnitude of charge difference between the PTFE particle surfaces and the coupled oil molecules.

It is also advantageous when the PTFE particles are essentially present as primary particles in the dispersion.

With the method according to the invention for producing long-term stable oil PTFE dispersions, modified PTFE (emulsion) polymers are mixed with persistent perfluoro(peroxy) radicals jointly with at least one olefinically unsaturated oil or oil mixture, which has at least olefinically unsaturated oil components, and subsequently the modified PTFE (emulsion) polymers are subjected to a mechanical stress, whereby the modified PTFE (emulsion) polymers used are deagglomerated and finely dispersed.

Advantageously, radiation chemically or plasma chemically treated PTFE (emulsion) polymers or PTFE (emulsion) polymers with perfluoro(peroxy) radical centers originating from the polymerization process are used as modified PTFE (emulsion) polymers, wherein even more advantageously the radiation chemical treatment of the PTFE (emulsion) polymers is carried out under the influence of oxygen.

Likewise advantageously, as oils or oil mixtures those are used that comprise mainly or entirely olefinically unsaturated oils or oil components.

Furthermore advantageously, the mixing is carried out in a dispersion unit.

And also advantageously a shearing stress is applied as a mechanical stress.

It is also advantageous if the mechanical stress is applied by an ultrasonic treatment, by an ULTRA TURRAX (mixer with high shear effect) agitator, by a toothed disk mill or by atomizing the mixture or by a combination of dispersion methods and dispersion tools.

And it is also advantageous if dispersion agents and dispersion stabilizer(s) are added.

DETAILED DESCRIPTION OF THE EMBODIMENTS

With the oil PTFE dispersion according to the invention, molecules of the monoolefinically or polyolefinically unsaturated oil or oil mixture are covalently/chemically coupled to the surface of the PTFE particles by radical reactions. The already present agglomerates must thereby be restored to PTFE primary particles again by mechanical stress and the agglomeration of the PTFE particles must be prevented during the radical reaction. Through the deagglomeration of the PTFE particles and the chemical coupling of oil molecules to the PTFE particle surface at the same time a permanent charge separation is achieved between the PTFE particles and the oil molecules, which helps to improve the dispersion stabilization and leads to the long-term stable oil PTFE dispersion according to the invention.

Within the scope of the present invention the long-term stability can thereby mean that no appreciable separation of the oil PTFE dispersion occurs within hours to days, or to months or even to years.

Furthermore, according to the invention the addition of dispersion agent(s) and dispersion stabilizer(s) can be omitted in part or even completely.

Likewise an additional treatment of the unsaturated oils or oil constituents in the oil PTFE dispersion is possible by hydrogenation of the olefinic double bonds.

The present invention differs from the solutions of the prior art in that previously no long-term stable oil PTFE dispersions could be produced, since previously no covalent/chemical coupling/grafting of the oil molecules to the PTFE particles was known or could be achieved.

As is known, oils are not monomers, since the allylic double bonds of the olefinically unsaturated oils are not radically or ionically polymerizable in terms of polymer chemistry, i.e., no polymers form through chain reactions and act in a polymerization-inhibiting/terminating manner. In contrast to the known coupling/grafting of PTFE with monomers, a graft (co)polymerization is not possible with oils.

It was therefore to be assumed that due to the reaction mechanisms of olefinically unsaturated oils that have been known for many years, no reactions at all would occur between the PTFE particles and the olefinically unsaturated oils.

Surprisingly, however, through the use of modified PTFE polymers and preferably PTFE (emulsion) polymers with persistent perfluoro (peroxy) radicals a radical reaction takes place, which in conjunction with the mechanical stress to deagglomeration of PTFE agglomerates to PTFE primary particles a radical reaction and thus a covalent/chemical coupling between the oil molecules and the PTFE particle surface.

Furthermore, due to the mechanical stress of the PTFE particles, a clear and permanent charge separation between the coupled oil molecules and the PTFE particle surface is evidently achieved, through which on the one hand no more oil molecules and/or PTFE particles can attach to the PTFE particle surface and at the same time no further coupling of already coupled oil molecules with the PTFE particle surface can occur. Through this virtually every individual PTFE particle is kept away from the other PTFE particles through the coupled oil molecules and through electrostatic repulsion and an agglomeration cannot occur or can occur only to a limited extent.

It is known that PTFE with persistent perfluoro (peroxy) radicals is capable of reaction with olefinically unsaturated compounds, such as monomers, macromers, oligomers and polymers. A direct surface modification of the PTFE (micro/nano) particles is thereby achieved. With the use according to the invention of especially (plasma- and or radiation-) modified PTFE emulsion polymer with persistent perfluoro (peroxy) radicals, which are composed of microparticles and/or nanoparticles, in the conversion with olefinically unsaturated oils it was surprisingly established with the use of mechanical stress that very finely dispersed, long-term stable oil PTFE dispersions form which even when diluted with unsaturated and/or saturated oils or after the (subsequent) hydrogenation of the olefinically unsaturated double bonds, do not exhibit any sedimentation phenomena. This phenomenon is attributed to the electrostatic charge and charge separation of the oil PTFE dispersion particles during the dispersion under mechanical stress. This charge separation between the otherwise incompatible components—the PTFE particle and the oil molecules coupled to the PTFE particle surface—was surprising and is the reason for the long-term stable dispersion in the oil PTFE lubricant system.

The decisive factors for the dispersion of the PTFE in the screw clearance of an ULTRA TURRAX agitator as a dispersing tool are the shear gradient and the retention time of the particles in the shear field or screw clearance. With an ULTRA TURRAX agitator of this type the mechanical stress according to the invention can be applied to the PTFE particles in the oil or oil mixture. Through the large acceleration forces during the radial passage of the PTFE particles, the PTFE particles in the oil are stressed by very strong shearing forces and thrusting forces. In the screw clearance between the rotor and the stator additional turbulences occur which lead to an optimal separation and distribution of the PTFE in the oil. The degree of dispersion effectiveness is obtained from the product of shear gradient and retention time. The optimal dispersion range for the circumferential speed of the rotor/stator arrangement is in the range of 10 to 24 m/s, wherein very good results are still obtained outside this range depending on the time.

In the optimal range a processing time of a few minutes is usually sufficient.

Another possibility for applying a mechanical stress to the PTFE particles is to atomize the oil PTFE mixture onto a hard substrate. When the oil PTFE particle mixture is pressed/atomized at high speed from a (round or slot) nozzle or an annular gap and strikes a baffle plate/hard substrate, a finely distributed stable oil PTFE dispersion is obtained. It is advantageous if this mixture is atomized at a temperature of >25° C. and preferably >60° C.

Analogous effects can be achieved while guiding through an oil PTFE mixture at higher pressure through a screen or several screens/screen pack [screens (filter disks) with mesh width<50 μm, preferably <25 μm, arrangement with the same or variable mesh widths] and/or through sintered metal screens or sintered metal disks/sintered metal filter screens and/or through mixing units/static mixers cut accordingly.

Another very elegant method for dispersion is the treatment of the oil PTFE mixture with ultrasound. It has proven to be advantageous if the mixture (in circulation if possible) is guided past/conducted past the ultrasound probe directly and is thus dispersed in the ultrasonic field.

For specific PTFE nanopowders or micropowders, preferably modified PTFE powders with higher radiation doses, such as PTFE nanopowders>100 kGy and PTFE micropowders>250 kGy, a toothed disk agitator (e.g., Dispermat) can also be used successfully for the application of the mechanical stress. The shearing action has proven to be adequate for the production of a stable dispersion.

The major advantage of this invention is the long-term stability of the oil PTFE dispersion as a special lubricant system. This oil PTFE lubricant system is stable even without additives/admixtures and auxiliary equipment for redispersing the otherwise sedimenting PTFE in oil-lubricated power-transmission devices. This system has an advantageous effect above all with units operated slowly. When the oil is expelled from the gap by the pressure of the unit components and the components are more or less in direct contact with one another, an increased friction is generated/produced thereby, which leads (a) to energy losses through friction and (b) to an increased wear. Under such conditions, the long-term stable oil PTFE dispersions guarantee that although the oil is expelled in the gap, the PTFE with the special antiadhesive properties as solid lubricant component in the oil PTFE dispersion has an advantageous effect in the friction gap as a solid lubricant and thus reduces the friction coefficients as well as the wear. The (carbonyl fluoride and/or carboxylic acid) groups generated by modification in the presence of oxygen in the PTFE advantageously have an adhesion promoting effect under pressure/the pressing power between the component surfaces, so that on the surface an adhesive, sliding friction promoting PTFE film is formed, which is present in a non-fixed manner without these functional groups and can be easily separated.

This advantage can also be advantageous in the processing of oil PTFE dispersions of this type to form fats and later in the use of these fats, since the PTFE in the fat then does not tend to agglomerate or clump.

It is known that olefinically unsaturated oils tend to resinify. This can be a disadvantage in technical applications. Further advantageous variants of the solution according to the invention therefore lie in that after the reactive conversion of the PTFE (emulsion) polymer with the olefinically unsaturated oil (a) the concentrated oil PTFE dispersion is diluted with a saturated/non-resinifying oil or (b) the PTFE particles modified/grafted with oil molecules are separated from the dispersion and converted into a saturated/non-resinifying oil and are redispersed in this system. The advantageous properties of the dispersion stability of these PTFE products grafted with oil are retained and thus can also be transferred to other (base) oil systems and are not finally restricted to the oil in which the reactive coupling between the PTFE and the olefinically unsaturated oil was carried out.

The long-term stable oil PTFE dispersions are required above all in the field of mechanical engineering and here specifically in moving parts with tribological requirements in terms of sliding friction and wear, such as, e.g., in transmissions (control gears, gears for power transmission), bearings (ball bearings, roll-body bearings, friction bearings and hydrostatic as well as hydrodynamic friction bearings), piston machines, etc. Furthermore, dispersions of this type can be advantageously further processed to form fats, which have the property that the PTFE no longer agglomerates and phase-separates. Long-term stable oil PTFE dispersions do not show any sedimentation phenomena even after weeks and with dilution. The PTFE thus also remains active in the lubricant system even without additional (dispersion) agents or additional redispersion units.

The invention is explained in more detail below based on several exemplary embodiments.

COMPARISON EXAMPLE 1

135 g ester oil (PRIOLUBE (synthetic lubricant): without olefinically unsaturated double bonds/completely saturated) is placed in a 250 ml three-neck flask with pure nitrogen gassing/gas supply, an ULTRA TURRAX agitator and a short reflux condenser with Bunsen valve, and stirred for 30 min with nitrogen rinse. Subsequently, 15 g PTFE emulsion polymer (which was electron irradiated at 500 kGy in the presence of oxygen) is added, heated to 100° C. while being stirred and intensively stirred for 2 hours at 100° C. and a further 2 hours at 150° C. The dispersion is allowed to cool without stirring. Already during cooling the PTFE sediments relatively quickly and separates into a clear supernatant oil phase and the sedimented PTFE.

While the pure PRIOLUBE oil has a Brugger value of 29 MPa, the Brugger values of the oil in the clear supernatant oil phase increase only marginally to 33 MPa.

EXAMPLE 1

Analogously to comparison example 1, 135 g ester oil with olefinically unsaturated double bonds (SYNATIVE (natural lubricant): with olefinically unsaturated double bonds) is placed in a 250 ml three-neck flask with pure nitrogen gassing/gas supply, a toothed disk agitator and a short reflux condenser with Bunsen valve and stirred for 30 min with nitrogen rinse. Subsequently, 15 g PTFE emulsion polymer, comprising PTFE nanoparticles (which was electron irradiated at 300 kGy in the presence of oxygen, with PTFE primary particle sizes from 60 to 80 nm) is added, heated to 100° C. while being stirred and intensively stirred for 2 hours at 100° C. and a further 2 hours at 140° C. The dispersion is allowed to cool without stirring.

After cooling, a long-term stable oil PTFE dispersion is obtained, which does not exhibit any sedimentation phenomena even after 8 weeks, i.e., no PTFE is deposited. No sedimentation is observed even with dilution from 10% by weight of modified PTFE nanoparticles to 3% by weight.

While the pure SYNATIVE oil has a Brugger value of 26 MPa, the Bragger values of the oil with 10% by weight of modified PTFE nanoparticles increase to 160 MPa and of the oil with only 3% by weight of modified PTFE nanoparticles still to 68 MPa.

EXAMPLE 2

Analogously to comparison example 1, 120 g unsaturated ester oil (SYNATIVE: with olefinically unsaturated double bonds) is placed in a 250 ml three-neck flask with pure nitrogen gassing/gas supply, an ULTRA TURRAX agitator and a short reflux condenser with Bunsen valve and stirred for 30 min with nitrogen rinse. Subsequently, 30 g PTFE emulsion polymer, comprising PTFE microparticles (which was electron irradiated at 500 kGy in the presence of oxygen, with PTFE primary particle sizes of 200 nm) is added, heated to 100° C. while being stirred, and stirred intensively for 1 hour at 100° C. and a further hour at 150° C. The dispersion is allowed to cool without stirring.

After cooling, a long-term stable oil PTFE dispersion is obtained, which does not exhibit any sedimentation phenomena even after 10 weeks, i.e., no PTFE is deposited. No sedimentation is observed even with dilution from 20% by weight of modified PTFE microparticles to 2.5% by weight.

While the pure SYNATIVE oil has a Brugger value of 26 MPa, the Brugger values of the oil with 20% by weight of modified PTFE microparticles increases to 210 MPa and of the oil with only 2.5% by weight of modified PTFE microparticles still to 96 MPa.

The invention claimed is:

1. Long-term stable oil polytetrafluoroethylene (PTFE) dispersion comprising PTFE particles and at least one monoolefinically or polyolefinically unsaturated oil or oil mixture, wherein the molecules of the olefinically unsaturated oil or of the olefinically unsaturated components of the oil mixture are chemically coupled to PTFE particle surfaces via radical reactions, and wherein a permanent charge separation between the PTFE particle surfaces and the coupled oil molecules is present and a fine dispersion of the PTFE particles in the oil or oil mixture is present.

2. Long-term stable oil PTFE dispersion according to claim 1, in which the oils or oil mixtures are composed mainly or entirely of olefinically unsaturated oils or oil components.

3. Long-term stable oil PTFE dispersion according to claim 1, in which the PTFE modified with oil is present in the oil PTFE dispersions concentrated to 90% by weight or diluted to 0.1% by weight.

4. Long-term stable oil PTFE dispersion according to claim 3, in which the PTFE modified with oil is present in the oil PTFE dispersions concentrated to 60% by weight or diluted to 1.0% by weight.

5. Long-term stable oil PTFE dispersion according to claim 3, in which the PTFE modified with oil is present in the oil PTFE dispersion concentrated to 30% by weight or diluted to 3.0% by weight.

6. Long-term stable oil PTFE dispersion according to claim 3, in which the diluted oil PTFE dispersions are present diluted with the same oil or oil mixture of the oil PTFE dispersion.

7. Long-term stable oil PTFE dispersion according to claim 3, in which the diluted oil PTFE dispersions are present diluted with an oil or oil mixture that is different from that used but can be mixed with the oil PTFE dispersion.

8. Long-term stable oil PTFE dispersion according to claim 1, in which the permanent charge separation between the PTFE particle surfaces and the coupled oil molecules has an order of magnitude such that the dispersed PTFE particles repel one another.

9. Long-term stable oil PTFE dispersion according to claim 1, in which the permanent charge separation has at least one order of magnitude of charge difference between the PTFE particle surfaces and the coupled oil molecules.

10. Long-term stable oil PTFE dispersion according to claim 1, in which the PTFE particles are essentially present as primary particles in the dispersion.

11. Method for producing long-term stable oil PTFE dispersions in which modified PTFE polymers are mixed with persistent perfluoro(peroxy) radicals jointly with at least one olefinically unsaturated oil or oil mixture, which has at least olefinically unsaturated oil components, and subsequently the modified PTFE polymers are subjected to a mechanical stress, whereby the modified PTFE polymers used are deagglomerated and finely dispersed.

12. Method according to claim 11, in which radiation chemically or plasma chemically treated PTFE polymers or PTFE polymers with perfluoro(peroxy) radical centers originating from the polymerization process are used as modified PTFE polymers.

13. Method according to claim 12, in which the radiation chemical treatment of the PTFE polymers is carried out under the influence of oxygen.

14. Method according to claim 11, in which as oils or oil mixtures those are used that comprise mainly or entirely olefinically unsaturated oils or oil components.

15. Method according to claim 11, in which the mixing is carried out in a dispersion unit.

16. Method according to claim 11, in which a shearing stress is applied as a mechanical stress.

17. Method according to claim 11, in which the mechanical stress is applied by an ultrasonic treatment, by a mixer with high shear effect agitator, by a toothed disk mill or by atomizing the mixture or by a combination of dispersion methods and dispersion tools.

18. Method according to claim 11, in which dispersion agents and dispersion stabilizer(s) are added.

* * * * *